United States Patent
Takayanagi et al.

(10) Patent No.: US 7,688,575 B2
(45) Date of Patent: Mar. 30, 2010

(54) DISPLAY DEVICE AND INFORMATION PROCESSING APPARATUS

(75) Inventors: Masaya Takayanagi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/000,550

(22) Filed: Dec. 13, 2007

(65) Prior Publication Data

US 2008/0144268 A1 Jun. 19, 2008

(30) Foreign Application Priority Data

Dec. 19, 2006 (JP) .............................. 2006-341376

(51) Int. Cl.
H05K 5/00 (2006.01)
H05K 7/00 (2006.01)
(52) U.S. Cl. .............................. 361/679.21; 361/679.02
(58) Field of Classification Search ................. 361/681, 361/679.02, 679.21, 679.22, 679.27
See application file for complete search history.

(56) References Cited

U.S. PATENT DOCUMENTS 5,379,182 A * 1/1995 Fujimori et al. ............. 361/681
6,229,695 B1 * 5/2001 Moon ......................... 361/683
6,507,484 B2 * 1/2003 Fukuyoshi ................... 361/681
6,838,810 B1 * 1/2005 Bovio et al. ................. 313/422
6,989,986 B2 * 1/2006 Kumagai et al. ............. 361/681

FOREIGN PATENT DOCUMENTS

| JP | 10-246881 A | 9/1998 |
| JP | 11-338371 | 12/1999 |
| KR | 1999-69947 | 9/1999 |

OTHER PUBLICATIONS

Chinese Office Action mailed Apr. 10, 2009 for corresponding Chinese App. No. 200710194213.2. A partial English-language translation is provided.
Korean Office Action made of record as of Apr. 29, 2009 in corresponding Korean Patent Application No. 10-2007-0126781.

* cited by examiner

Primary Examiner—Jayprakash N Gandhi
Assistant Examiner—Anthony M Haughton
(74) Attorney, Agent, or Firm—Fujitsu Patent Center

(57) ABSTRACT

A display device includes: a display panel unit having a display screen on which information is displayed; and a housing having a front housing section that covers the edge of the display screen of the display panel unit and a back housing section that covers the back of the display panel unit. One of the front housing section and the back housing section covers an exterior of the other when the front housing section and the back housing section engage each other at a flank of the display panel unit, the one has a projection formed inside thereof, and the other has an opening in which the projection is engaged.

12 Claims, 16 Drawing Sheets

DISPLAY DEVICE AND INFORMATION PROCESSING APPARATUS

BACKGROUND OF THE INVENTION

1. Field of the Invention

The present invention relates to a display device that displays information and to an information processing apparatus that processes information and displays the processed information.

2. Description of the Related Art

In recent years, portable terminal apparatus provided with a display device, such as cell phones and laptop computers have been widely used. Generally, a slim display device provided with a liquid crystal panel is employed in such a portable terminal apparatus, because reduction in size and weight of the apparatus is strongly demanded.

The liquid crystal panel is composed of elements such as a display screen, a light source and a control circuit, which are all built therein. Usually, such a liquid crystal panel provided in a display device is accommodated in a housing for reasons such as making its appearance look good. The housing is typically composed of: a front cover that covers the display screen of a liquid crystal panel without interfering with the display; and a rear cover that covers the back of the liquid crystal panel. In addition, it is assumed that a liquid crystal panel or the like of a portable terminal apparatus can be removed from the housing for the purpose of repair. Therefore, the front cover and the back cover are configured to engage each other at flanks of the liquid crystal panel so that they can be detached from each other as necessary (for example, see Japanese Patent Laid-Open No. 11-338371).

By the way, as for laptop computers, a display screen is required to be as large as possible, while the size of the entire computer is required to be as small as possible. In order to meet both of these requirements, it is conceivable to tightly accommodate the liquid crystal panel in the housing with no gaps in between and also to reduce the area where the front cover and the back cover engage each other.

However, a conventional way of engagement has such a problem that it is difficult to shrink the engagement portions of the front cover and the back cover and also to shrink a space within the housing used for allowing the bending of the engagement portions, thereby increasing the breadth of the entire apparatus.

This is not a problem limited to display devices employing a liquid crystal panel, but it generally occurs in any display device having a display panel contained in the housing of the device.

SUMMARY OF THE INVENTION

The present invention has been made in view of the above circumstances, and provides a display device and an information processing apparatus in which the engagement portion of two housing sections of a housing is made small and particularly, the breadth of the device or apparatus is reduced.

A display device of the present invention includes:

a display panel unit having a display screen on which information is displayed; and a housing having a front housing section that covers the edge of the display screen of the display panel unit and a back housing section that covers the back of the display panel unit, in which one of the front housing section and the back housing section covers an exterior of the other when the front housing section and the back housing section engage each other at a flank of the display panel unit, the one has a projection formed inside thereof, and the other has an opening in which the projection is engaged.

According to the display device of the present invention, one of the front housing section and the back housing section covers an exterior of the other when the front housing section and the back housing section engage each other, the one has a projection formed inside thereof, and the other has an opening in which the projection is engaged. The projection bends toward the outside of the housing when the front housing section and the back housing section engage each other and thus, there is no need to provide a space inside the housing for allowing the bending, thereby decreasing the size of the device.

In addition, in the display device according to the present invention, preferably, the front housing section of the housing covers an exterior of the back housing section when the front housing section and the back housing section engage each other.

The area of the front housing section is smaller than the back housing section and thus is lower in strength than the back housing section. Therefore, when the opening is formed in the back housing section having a higher strength, it is possible to increase the strength of the entire display device.

Further, in the display device according to the present invention, preferably, the other one of the front housing section and the back housing section has a wall surrounding the opening, a hole is formed in the wall, and the one of the front housing section and the back housing section has an assist projection engaged in the hole.

Engagement of the assist projection in the hole makes it possible to reliably secure the front housing section and the back housing section to each other.

The present invention also provides an information processing apparatus that includes:

a display section having:

a display panel unit having a display screen on which information is displayed, and a housing having a front housing section that covers the edge of the display screen of the display panel unit and a back housing section that covers the back of the display panel unit, in which one of the front housing section and the back housing section covers an exterior of the other when the front housing section and the back housing section engage each other at a flank of the display panel unit, the one has a projection formed inside thereof, and the other has an opening in which the projection is engaged; and an information processing section that processes information and causes the display section to display the processed information on the display screen of the display panel unit included in the display section.

According to this information processing apparatus, it is possible to prevent the size of the apparatus from being increased by the engagement portions of the two housings.

Further, in the information processing apparatus according to the present invention, preferably, the front housing section of the housing covers an exterior of the back housing section when the front housing section and the back housing section engage each other.

When the opening is formed in the back housing section having a relatively higher strength, it is possible to increase the strength of the entire information processing apparatus.

Furthermore, in the information processing apparatus according to the present invention, preferably, the other one of the front housing section and the back housing section has a wall surrounding the opening, a hole is formed in the wall, and the one of the front housing section and the back housing section has an assist projection engaged in the hole.

According to the information processing apparatus with this additional feature, the front housing section and the back housing section can be reliably secured to each other by means of a simple mechanism.

According to the present invention, it is possible to provide a display device and an information processing apparatus that can prevent the size of the device or apparatus from being increased by the engagement portions of two housing sections forming a housing.

DETAILED DESCRIPTION OF THE INVENTION

Embodiments of the present invention will be described with reference to the drawings.

Figure 1:
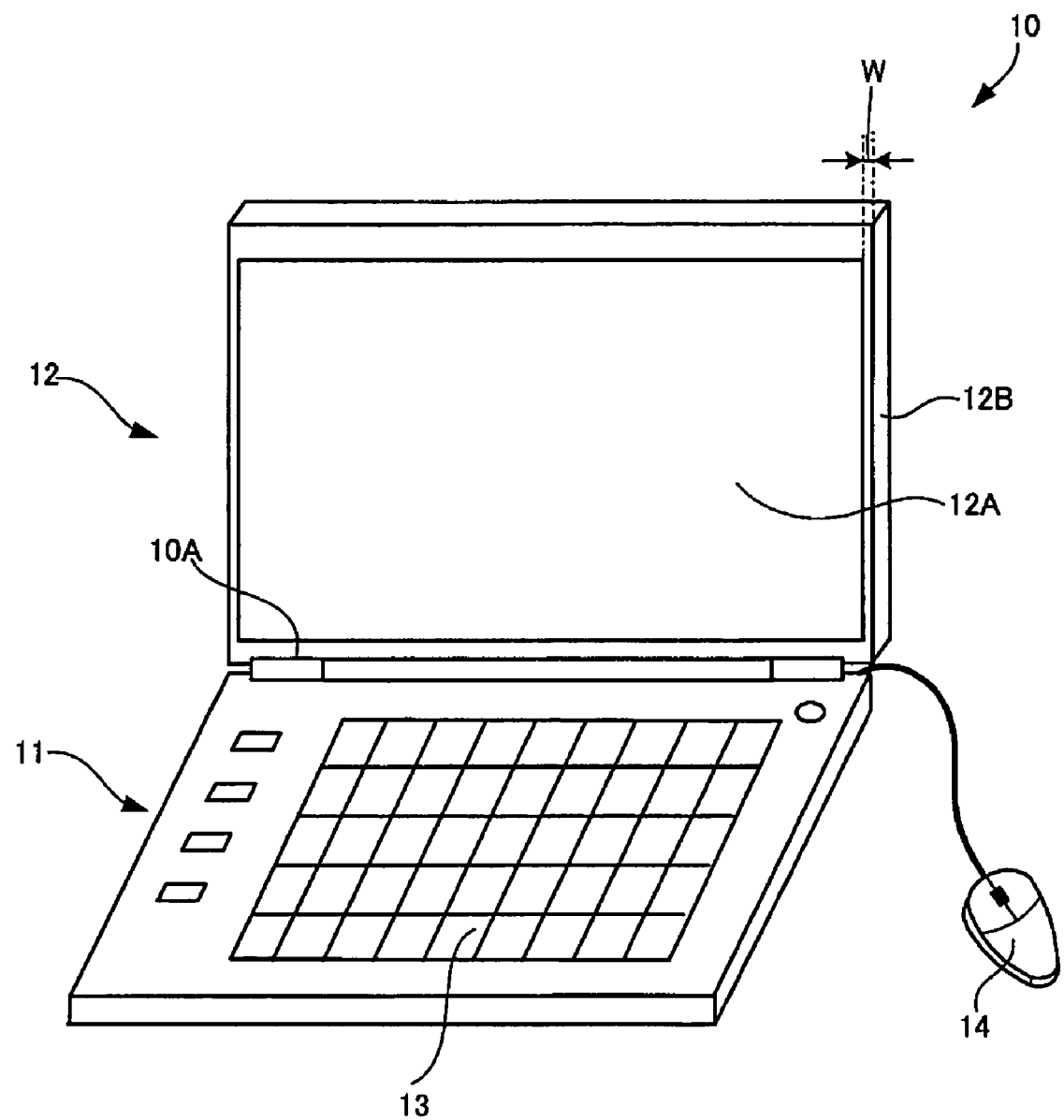
FIG. 1 is an external perspective view of a personal computer to which an embodiment of the present invention is applied.

FIG. 1 is an external perspective view of a personal computer 10 to which an embodiment of the present invention is applied.

Referring to FIG. 1, the personal computer 10 includes a main device 11, a display device 12 which displays various types of information on a display screen 12A according to a command from the main device 11, a keyboard 13 for inputting various types of information dependent on a key operation into the main device 11, and a mouse 14 by which a position on the display screen is specified, so that a command dependent on an icon or the like displayed on that position is inputted. Further, though not illustrated in FIG. 1, the personal computer 10 includes an FD mounting opening for mounting a flexible disk (hereinafter referred to as an FD) and a CD-ROM mounting opening for mounting a CD-ROM. The display screen 12A corresponds to an example of the display screen according to the present invention.

In the personal computer 10, the display device 12 is joined to the main device 11 via a hinge 10A. In the display device 12, the width W of a housing 12B at a margin beside the display screen 12A is small, thus achieving device downsizing. The display device 12 corresponds to an example of the display section according to the present invention, and also corresponds to one embodiment of the display device according to the present invention; and the main device 11 corresponds to an example of the processing section according to the present invention.

The configuration in the inside of the housing 12B of the display device 12 will be described in detail later.

Figure 2:
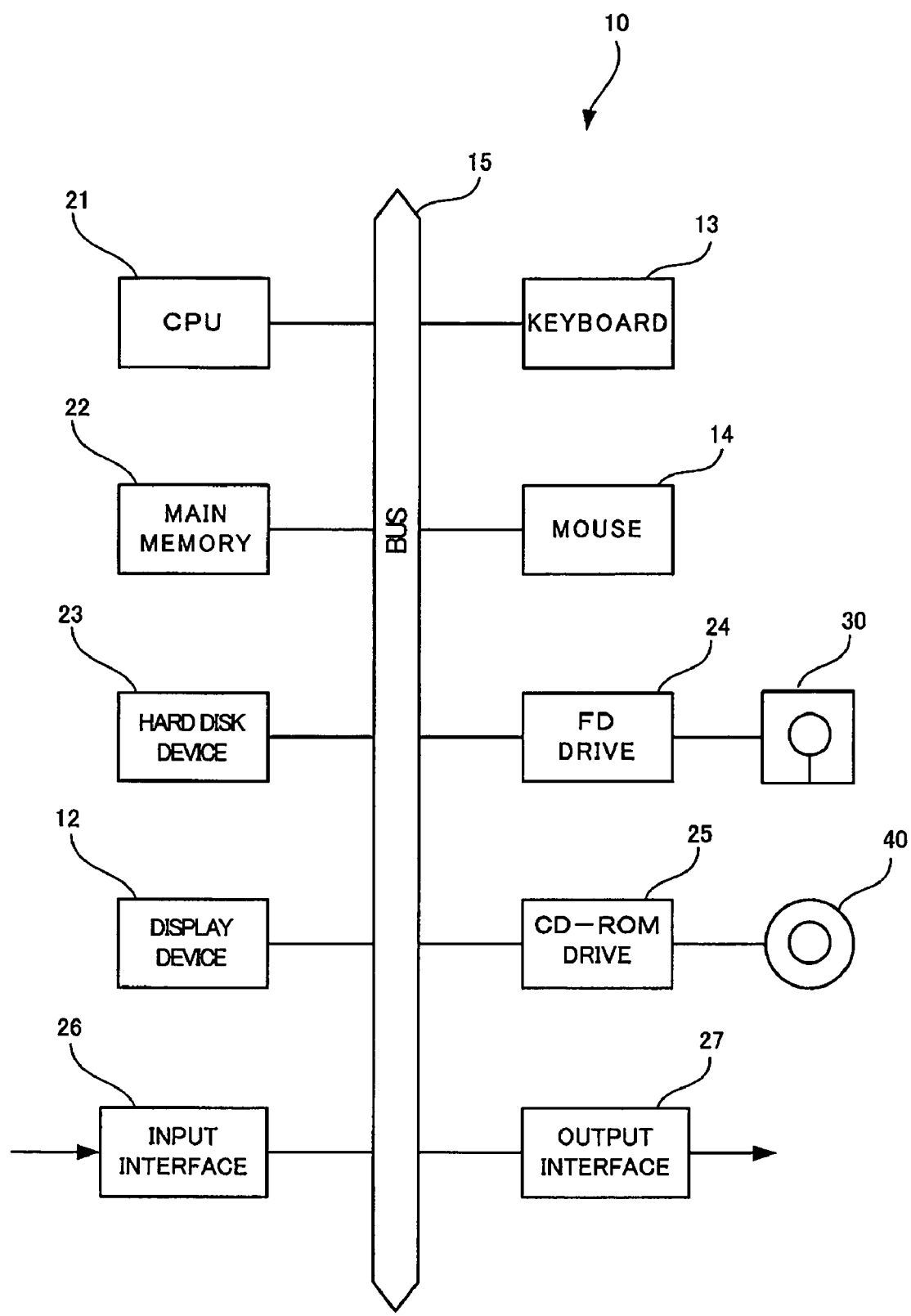
FIG. 2 is a hardware configuration diagram of the personal computer.

FIG. 2 is a hardware configuration diagram of the personal computer 10.

As illustrated in FIG. 2, incorporated in the inside of the main device 11 are: a CPU 21 which controls the whole personal computer 10; a main memory 22 into which a program stored in a hard disk device 23 is read to be executed by the CPU 21; the hard disk device 23 in which various types of programs, data and the like are stored; an FD drive 24 which an FD 30 mounted therein; a CD-ROM drive 25 which accesses a CD-ROM 40; an input interface 26 which is connected to various devices and receives various data; and an output interface 27 which is connected to a printer or the like and sends various data. These components, the display device 12, the keyboard 13 and the mouse 14 illustrated as well in FIG. 1 are connected to each other via a bus 15.

The personal computer 10 basically has the above-described configuration.

The internal configuration of the display device 12 will now be described in detail. In the following description, the "front" means the front side of the display device 12 illustrated in FIG. 1 where the display screen 12A for displaying information is disposed, and the "rear" means the rear side of the display device 12 (the other side with respect to the front side where the display screen 12A is disposed).

Figure 3A:
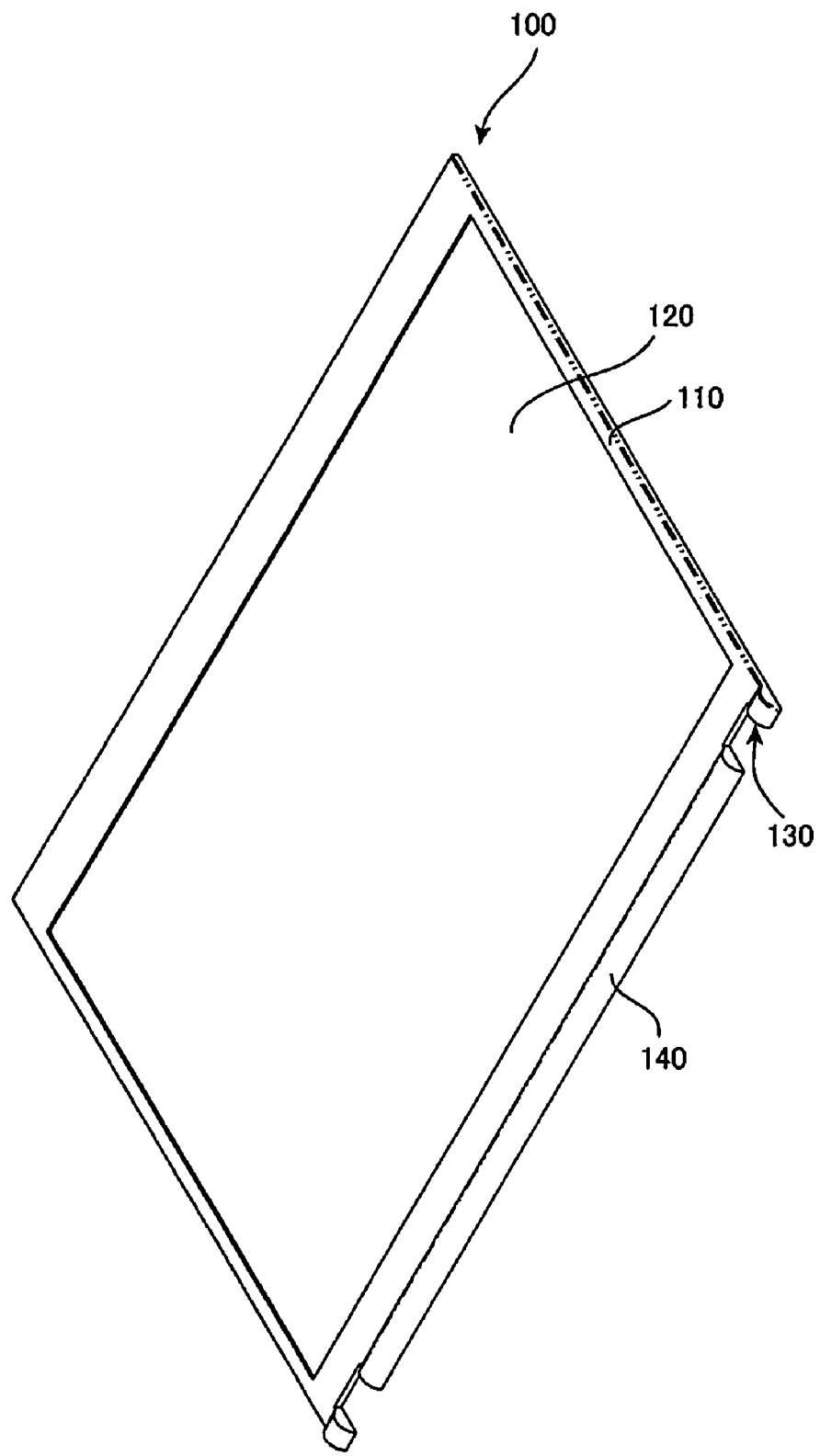
FIG. 3A is a view illustrating a front cover as viewed from the front.
Figure 3B:
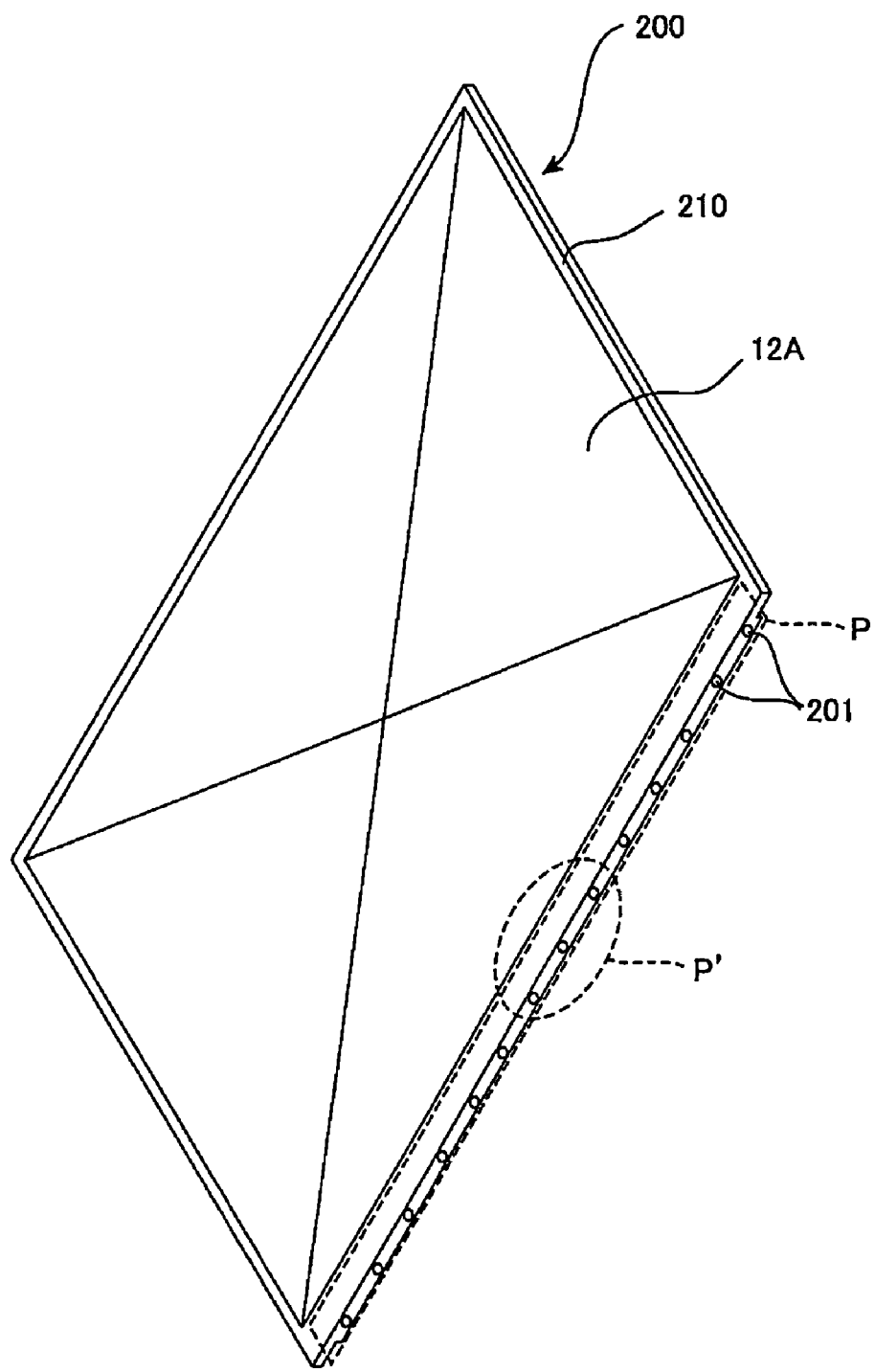
FIG. 3B is a view illustrating a display panel unit as viewed from the front.
Figure 3C:
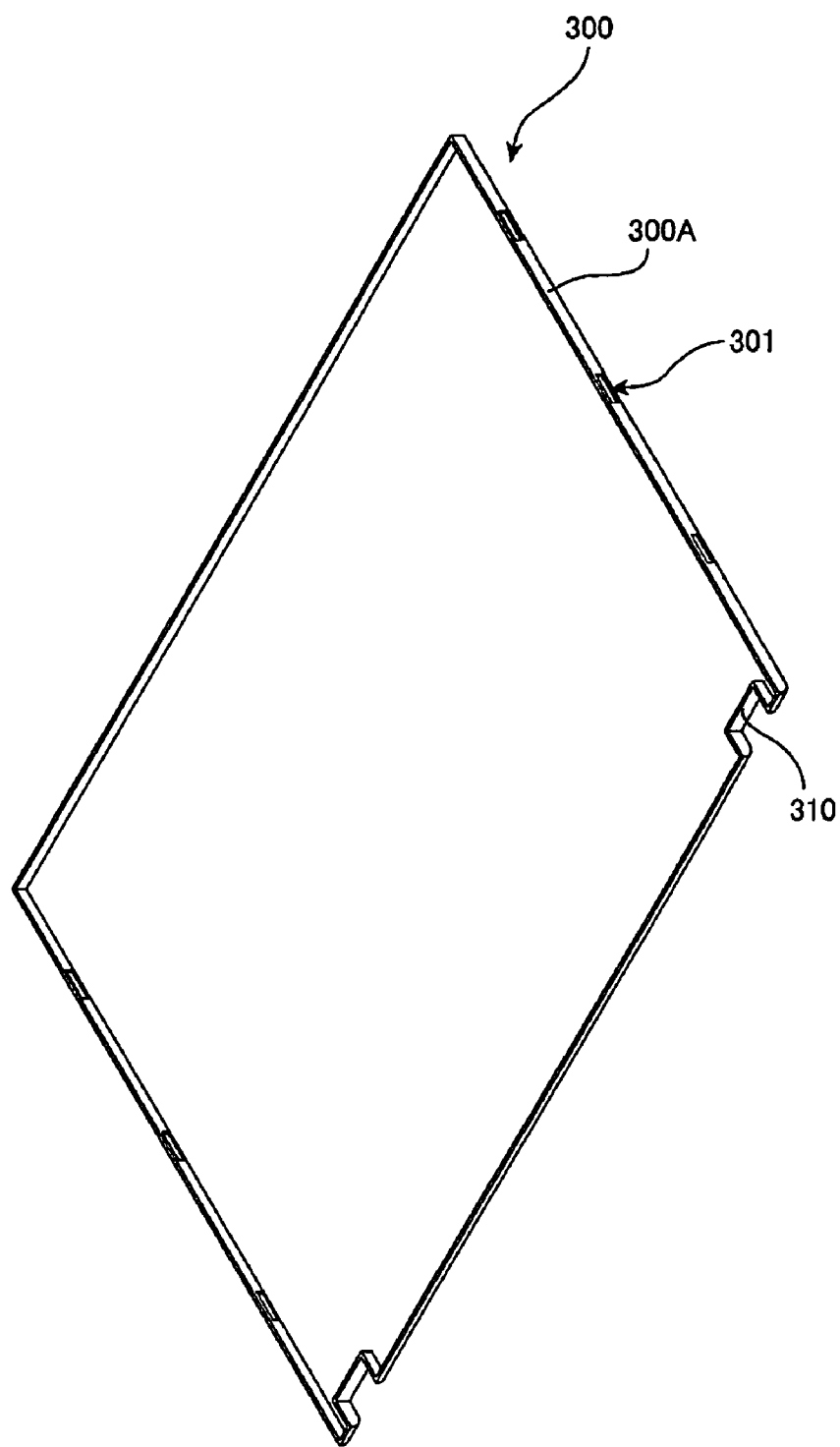
FIG. 3C is a view illustrating a rear cover as viewed from the front.
Figure 4A:
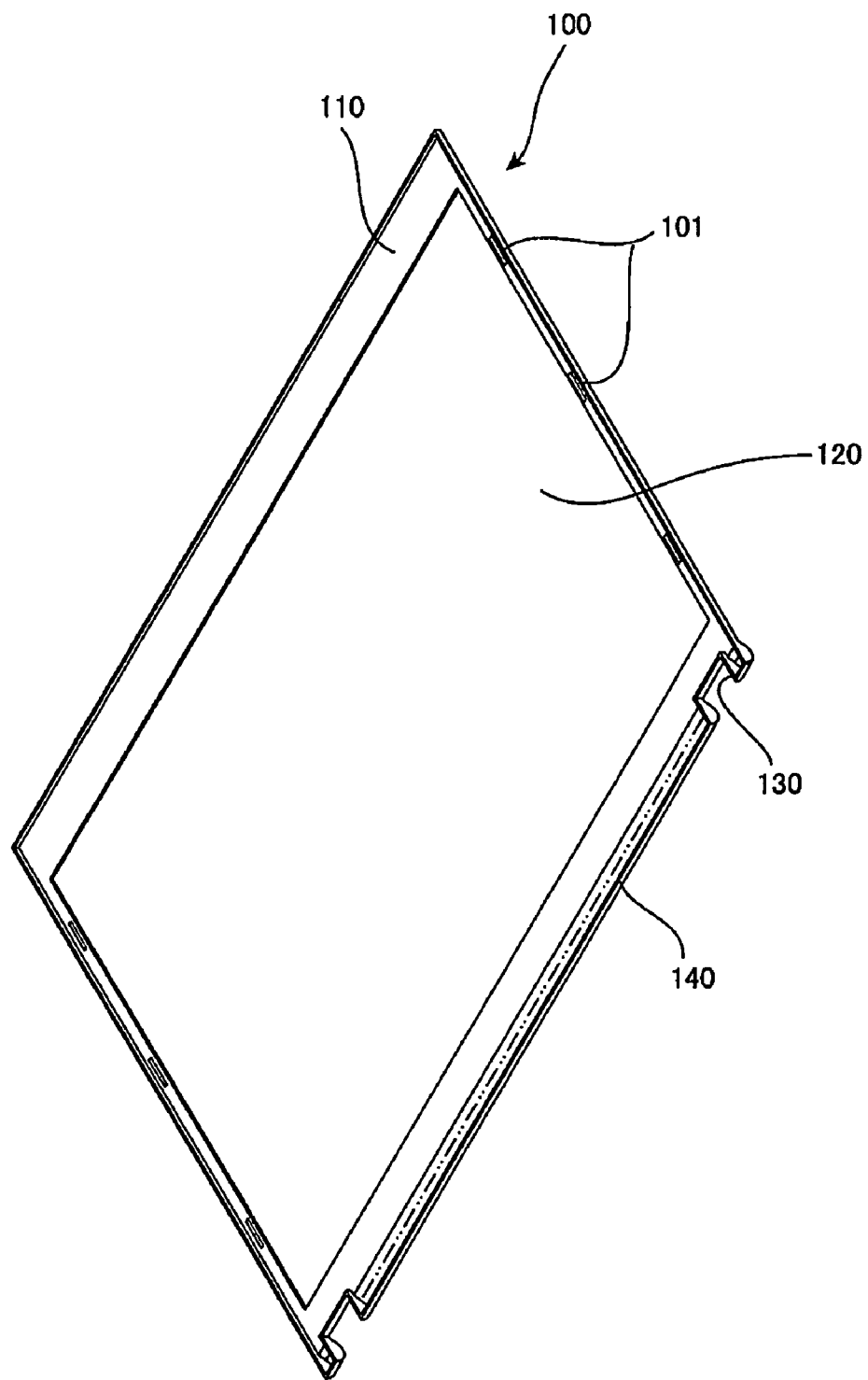
FIG. 4A is a view illustrating the front cover as viewed from the back.
Figure 4B:
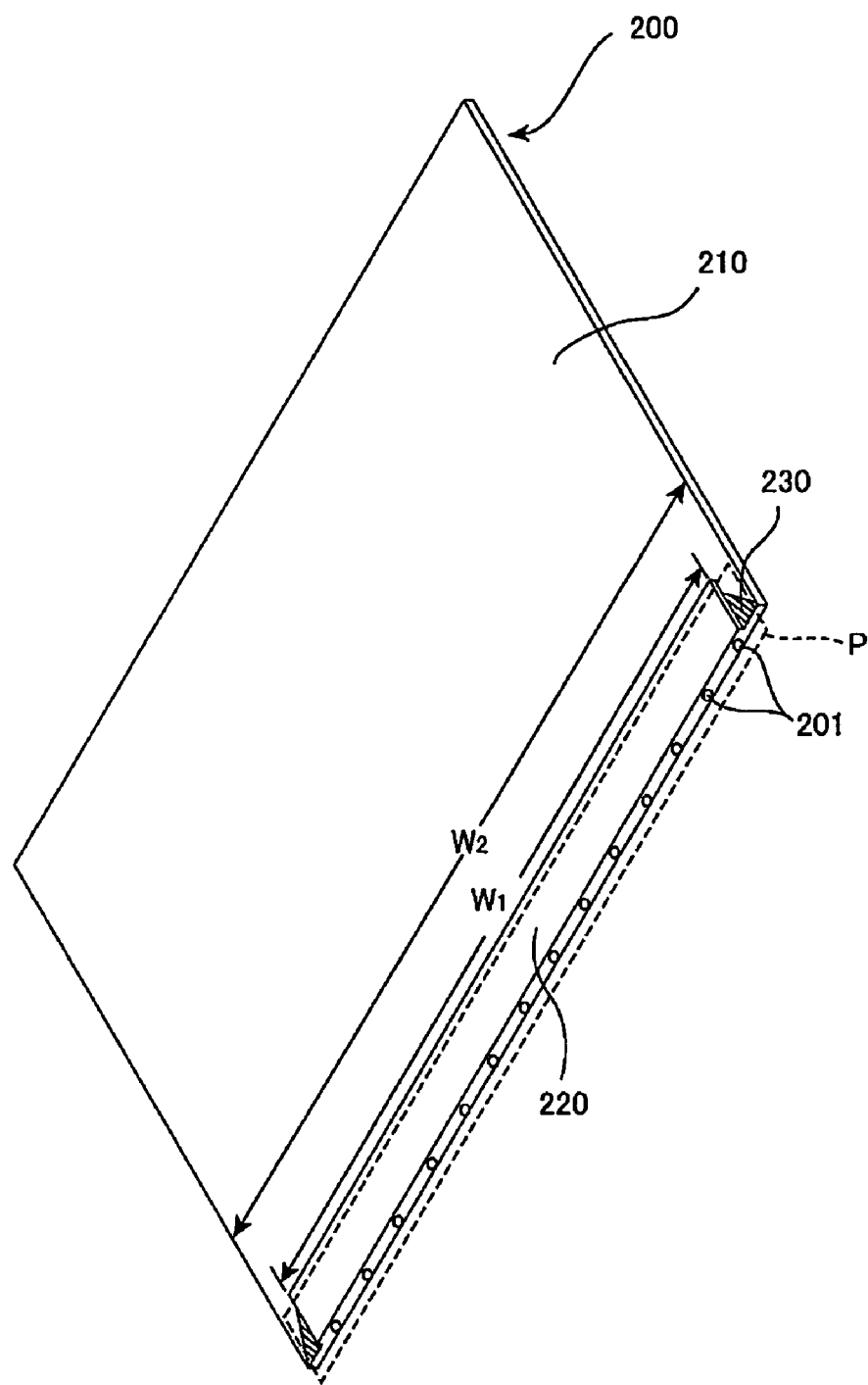
FIG. 4B is a view illustrating the display panel unit as viewed from the back.
Figure 4C:
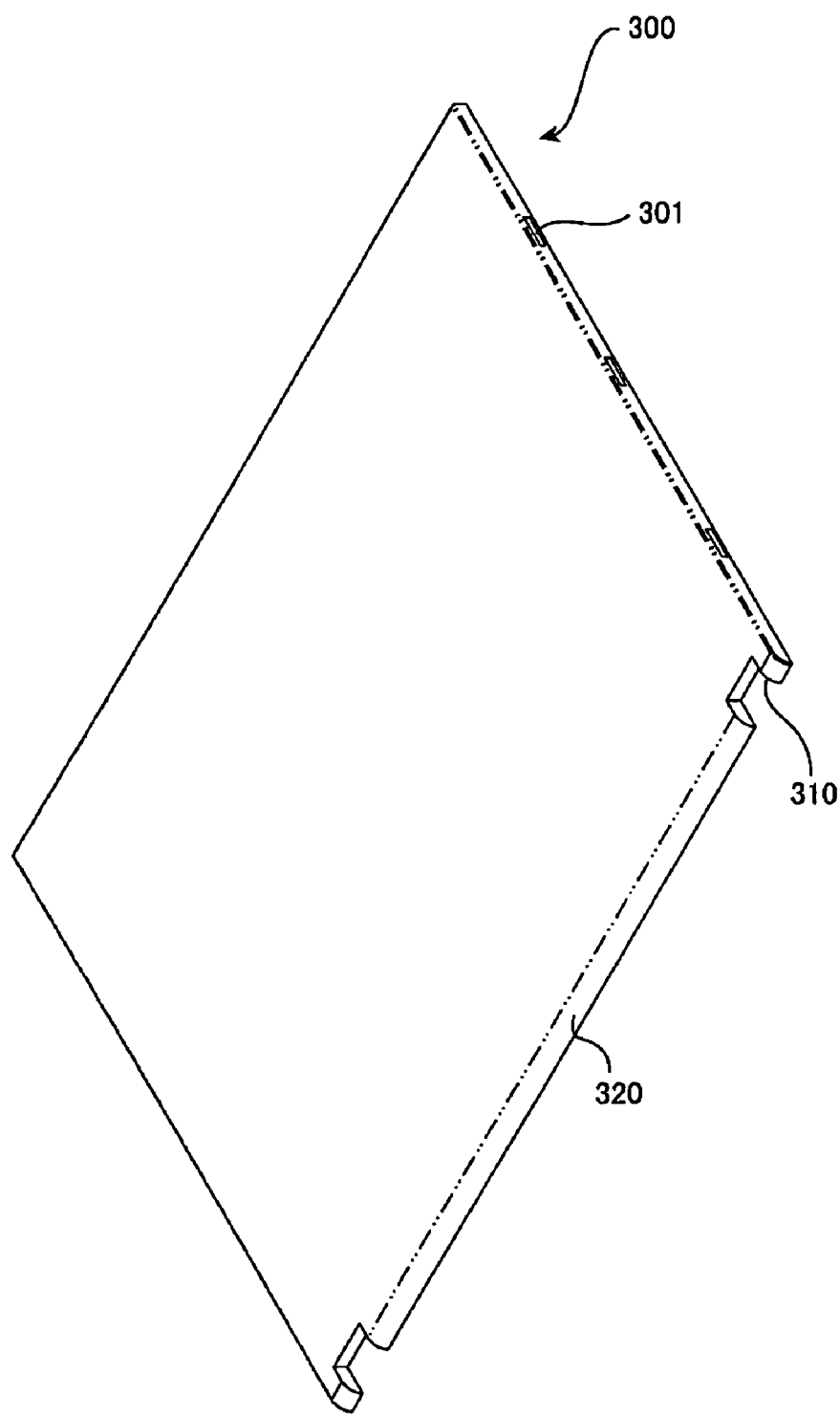
FIG. 4C is a view illustrating the rear cover as viewed from the back.

FIGS. 3A, 3B, 3C, 4A, 4B and 4C are views illustrating major components of the display device 12; FIGS. 3A and 4A illustrate a front cover 100; FIGS. 3B and 4B illustrate a display panel unit 200; FIGS. 3C and 4C illustrate a rear cover 300. FIGS. 3A, 3B and 3C illustrate each component as viewed from the "front"; FIGS. 4A, 4B and 4C illustrate each component as viewed from the "rear". Descriptions will be given below with reference to these component diagrams and FIG. 1.

In the display device 12, the display panel unit 200 is received in the housing 12B composed of two covers. The housing 12B includes: the front cover 100 covering the edge of the display screen 12A of the display panel unit 200; and the rear cover 300 covering the back of the display panel unit 200. The front cover 100 and the rear cover 300 are fit into each other at both sides of the display panel unit 200. The display panel unit 200 corresponds to an example of the display panel unit according to the present invention.

FIG. 3A illustrates the "front" side of the front cover 100.

The front cover 100 includes: an edge cover section 110 covering the edge of the display panel unit 200, a hinge joint section 130 to which the hinge 10A illustrated in FIG. 1 is attached, and a wiring cover section 140 which covers various connection lines and the like for connecting the main device 11 and the display device 12. An opening 120 is formed in that part of the edge cover section 110 which faces the display screen 12A of the display panel unit 200.

FIG. 3B illustrates the "front" side of the display panel unit 200.

The display panel unit 200 includes a panel body 210 that includes stacked components such as a liquid crystal layer having liquid crystal encapsulated between two plates, a light guide plate which guides light to the liquid crystal layer, and a reflection prevention sheet which suppresses light reflection, and also includes plural LED light sources 201 linearly arranged and fitted into the lower edge of the panel body 210. The display panel unit 200 also includes a control board 220 (refer to FIG. 4B) that controls the whole display panel unit 200. Light emitted by the LED light sources 201 is guided to the liquid crystal layer by the light guide plate provided on the panel body 210, and irradiated on the display screen 12A from the rear side. The LED light sources 201 tend to generate heat and further tend to be degraded by the heat. According to the present embodiment, the plural LED light sources 201 are linearly arranged; thus a linear area P into which the LED light sources 201 are fitted tends to have a high temperature and particularly in the central part P' of the area P, heat tends to accumulate.

FIG. 3C illustrates the "front" side of the rear cover 300.

The rear cover 300 includes a rear cover section 300A that covers the rear face of the display panel unit 200, and a hinge joint section 310 to which the hinge 10A is attached. And plural through holes 301 are formed in that part of the rear cover section 300A which covers the side of the display panel unit 200.

FIG. 4A illustrates the "rear" side of the front cover 100.

Plural protrusions 101 are provided in that part of the edge cover section 110 of the front cover 100 which covers the side of the display panel unit 200; when these protrusions 101 are fitted into the plural through holes 301 arranged in the rear cover section 300A, the rear cover 300 and the front cover 100 are joined in a separable manner.

FIG. 4B illustrates the "rear" side of the display panel unit 200.

In the rear face of the panel body 210, a radiator plate 230 for dissipating heat is attached onto area P which is heated by the LED light sources 201, and further the control board 220 which controls the whole display panel unit 200 is placed on the radiator plate 230. According to the present embodiment, the width W1 of the control board 220 is smaller than the width W2 of the panel body 210, and thus steps are formed at both sides of the control board 220.

FIG. 4C illustrates the "rear" side of the rear cover 300.

The rear cover 300 is also provided with a wiring cover section 320 which fits in the wiring cover section 140 of the front cover 100 and covers various connection lines from the back of the display panel unit 200.

In assembling the display device 12, firstly the display panel unit 200 is received in the front cover 100 so that the display screen 12A of the display panel unit 200 fits into the opening 120 of the front cover 100.

Subsequently, an antenna 400 (refer to FIG. 5) is arranged in an open space between the front cover 100 and the display panel unit 200, the open space being formed in the upper part of the front cover 100.

Figure 5:
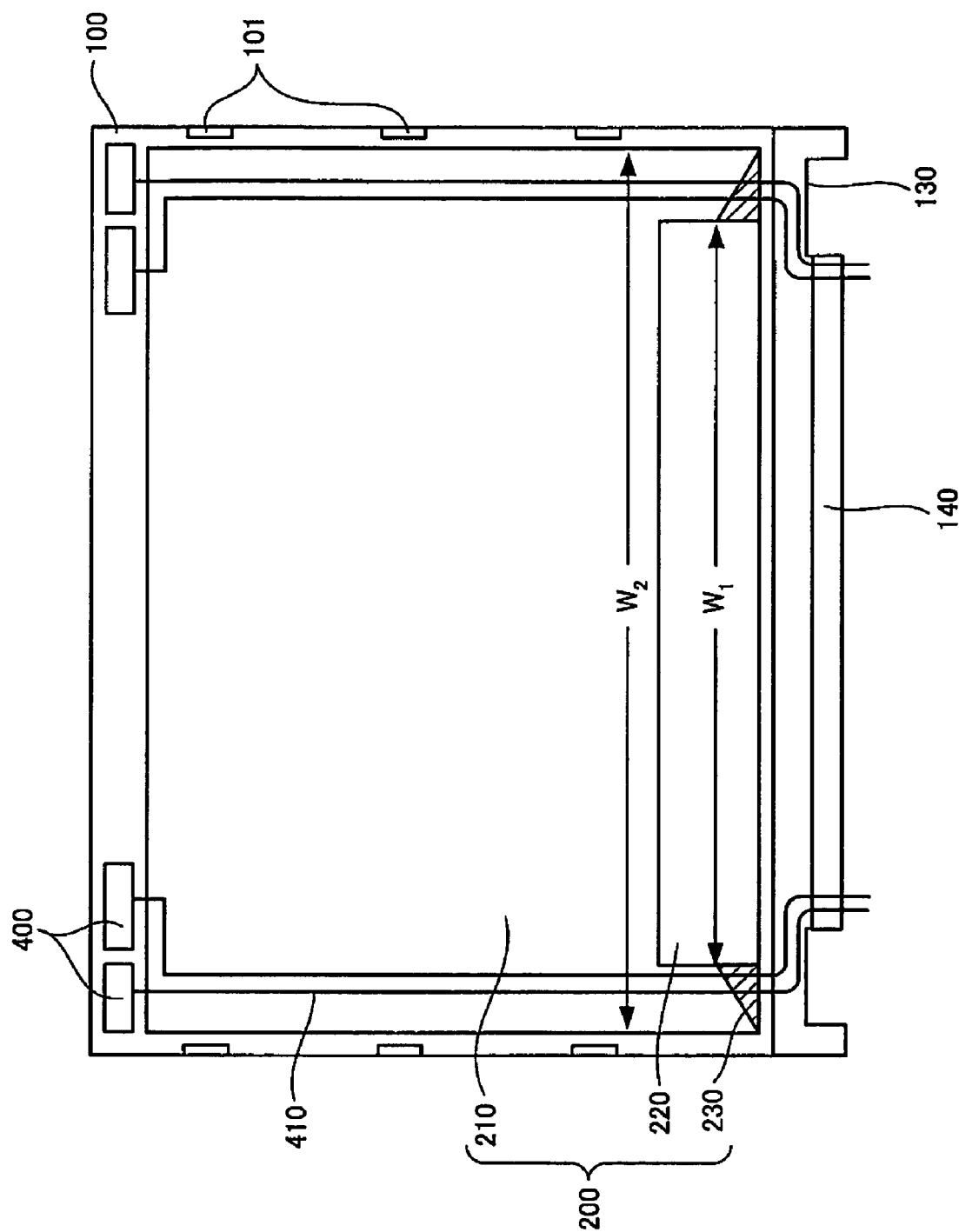
FIG. 5 is a view illustrating the internal configuration of the front cover in which the display panel unit and an antenna are arranged.

FIG. 5 is a view illustrating the internal configuration of the front cover 100 in which the display panel unit 200 and the antenna 400 are arranged.

As illustrated in FIG. 5, the display panel unit 200 is received in the front cover 100 while the front cover 100 has a remaining space in the upper part thereof; the antenna 400 is arranged in the space. According to the present embodiment, the width W1 of the control board 220 is smaller than the width W2 of the panel body 210, and thus steps are formed at both sides of the control board 220; a signal line 410 extending from the antenna 400 runs through the steps to the wiring cover section 140.

As illustrated in FIG. 3B, of the linear area P having fitted therein the LED light sources 201 of the panel body 210, particularly the central part P' tends to have a high temperature.

Figure 6:
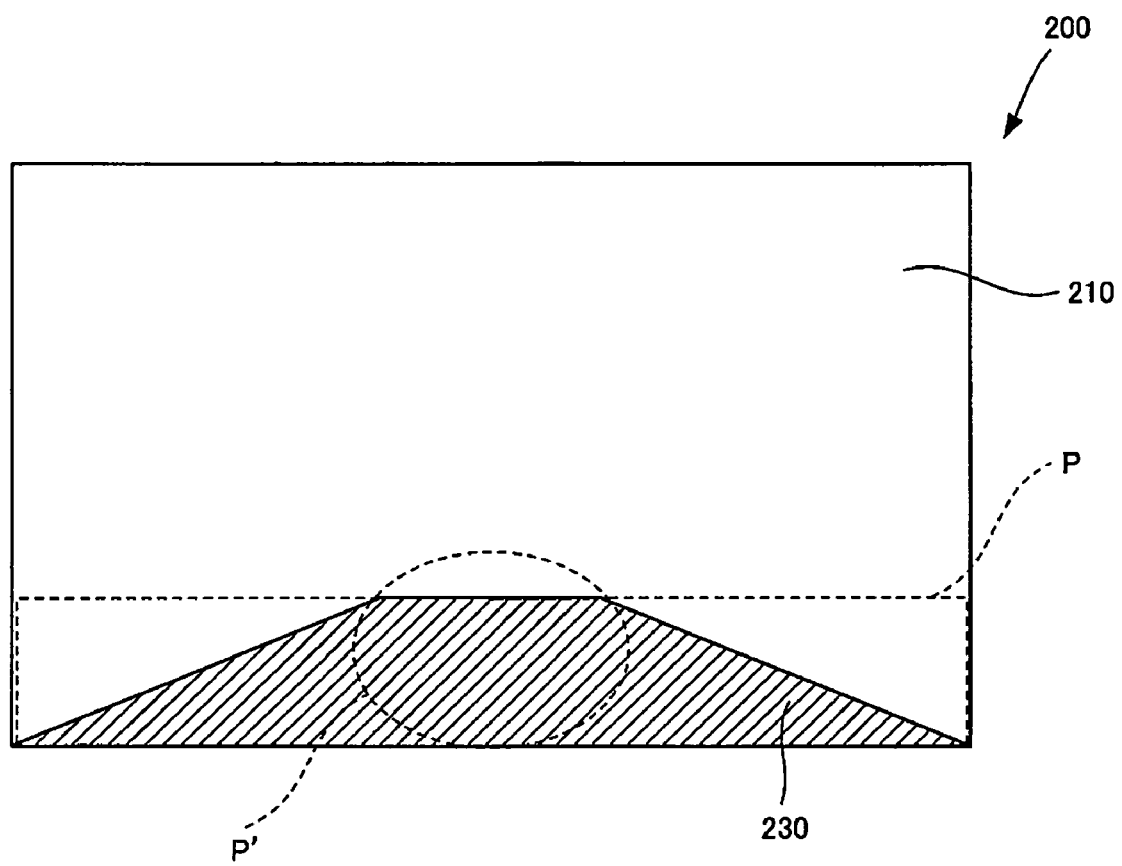
FIG. 6 is a view illustrating the display panel unit from which a control board has been removed.

FIG. 6 is a view illustrating the display panel unit 200 from which the control board 220 has been removed.

As illustrated in FIG. 6, the radiator plate 230 extends along the linear area P; the width of the linear area P becomes smaller from the central part P' to the end of the linear area P. Accordingly, heat is dissipated relatively efficiently in the central part P', suppressing non-uniformity of temperature in the linear area P and thus allowing improvement of life of all the plural LED light sources 201.

As described above, after the display panel unit 200 and antenna 400 are received in the front cover 100, the protrusions 101 of the front cover 100 are fitted into the through holes 301 of the rear cover 300, whereby the housing 12B is assembled.

Figure 7:
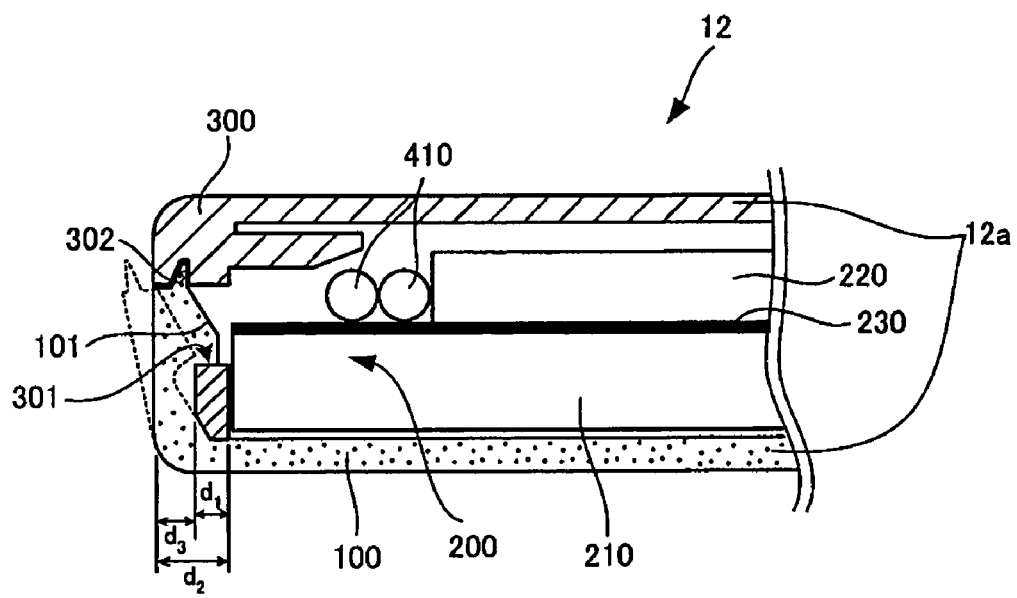
FIG. 7 is a cross-sectional view of a display device taken along a direction in which a radiator plate extends.
Figure 8:
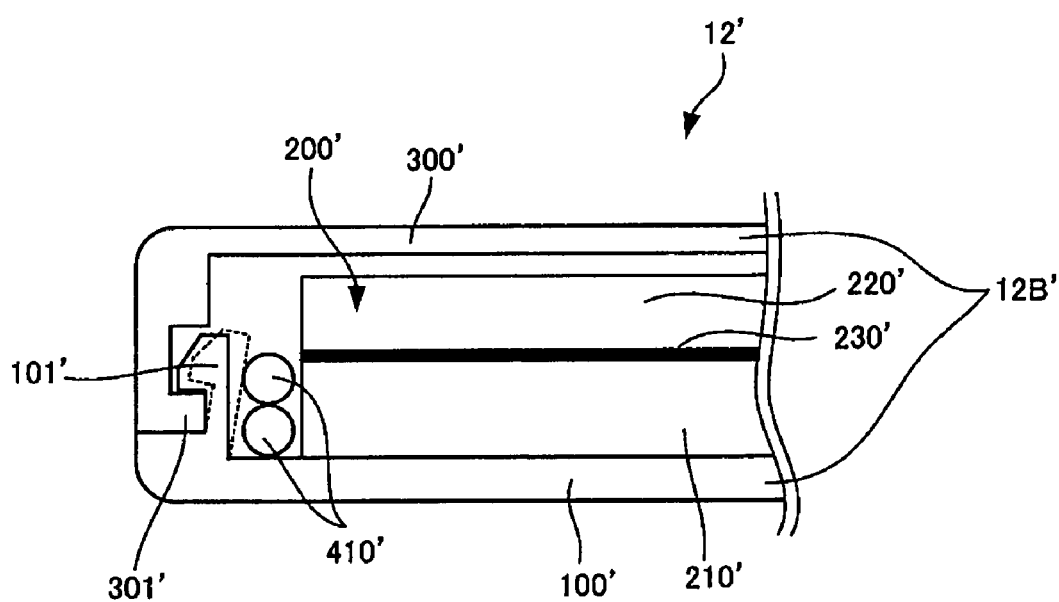
FIG. 8 is a cross-sectional view of a conventional display device taken along a direction in which a radiator plate extends.

FIG. 7 is a cross-sectional view of the display device 12 taken along a direction in which the radiator plate 230 extends; FIG. 8 is a cross-sectional view of a conventional display device taken along a direction in which the radiator plate extends.

In the display device 12 according to the present embodiment, as illustrated in FIG. 7, the rear cover 300 is formed so that the wall thickness d1 in the face side thereof is thinner than the wall thickness d2 in the rear side; the change in thickness of the rear cover 300 takes place across the through holes 301. Further, the front cover 100 is formed so that the wall thickness d3 in the face side thereof is approximately equal to a wall width difference (d2−d1) of the rear cover 300; the change in thickness of the front cover 100 takes place across the protrusions 101. Accordingly, when the front cover 100 and the rear cover 300 are joined, the external surface of the housing 12B becomes smooth. Also, the protrusions 101 of the front cover 100 are fitted into the through holes 301 of the rear cover 300 while pressed to the side surfaces of the rear cover 300 and bent toward the outside of the housing 12B; further, assist protrusions 302 are fitted into the rear cover 300. As a result, the front cover 100 and rear cover 300 are secured to each other.

In the conventional display device 12', as illustrated in FIG. 8, because clicks 101' and 301' provided in a front cover 100' and a rear cover 300', respectively engage with each other in the inside of the housing 12B', there must be a sufficient space between the housing 12B' and display panel unit 200' so that these clicks 101' and 301' can bend. In the display device 12 according to the present embodiment illustrated in FIG. 7, the protrusions 101 bend toward the outside, so that the space between the housing 12B and display panel unit 200 can be reduced, allowing downsizing of the display device 12.

Further, in the conventional display device 12', as illustrated in FIG. 8, the width of the control board 220' is appropriately identical to that of the panel body 210' and thus a space for receiving signal lines 410' extending from the antenna 400 (refer to FIG. 5) must be prepared between the display panel unit 200' and housing 12B'. In the display device 12 illustrated in FIG. 7, the signal lines 410 are laid through the space beside the control board 220, allowing reduction of the width of display device.

As described above, according to the display device 12 of the present embodiment, the space between the housing and display panel unit 200 can be reduced, so that the display device 12 can be downsized without reducing the size of the display screen 12A.

Further, non-uniformity of temperature in the area around the heat-vulnerable LED light sources can be suppressed to efficiently dissipate heat, allowing improvement in life of the display device 12.

Now, the description of the first embodiment of the present invention is finished, and a second embodiment of the present invention will be described. The difference between the first embodiment and second embodiment lies in the structure of display panel unit and rear cover; apart from this difference, the second embodiment has substantially the same structure as the first embodiment. Accordingly, the same reference alphanumeric characters are applied to parts corresponding to the first embodiment, and hence an explanation thereof is omitted; only the points different from the first embodiment will be described.

Figure 9:
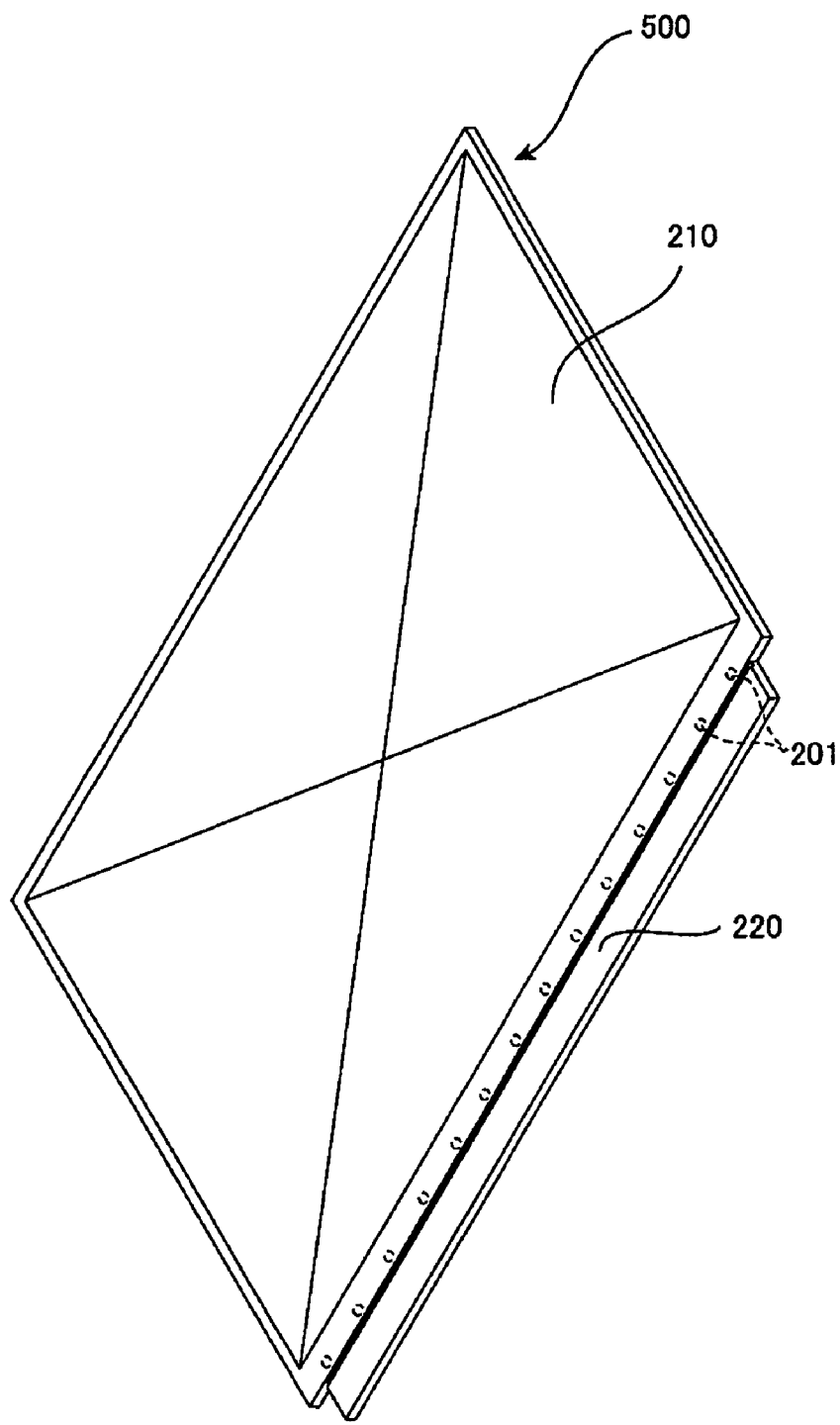
FIG. 9 is a view illustrating a display panel unit as viewed from the front according to a second embodiment of the present invention.

FIG. 9 is a view illustrating the front of a display panel unit 500 of the present embodiment.

The display panel unit 500 of the present embodiment illustrated in FIG. 9 includes, similarly to the display panel unit 200 of the first embodiment illustrated in FIG. 3B, a panel body 210 and control board 220; plural LED light sources 201 are fitted in the panel body 210. In the display panel unit 500, however, the control board 220 is not laid on the panel body 210, but disposed inside the housing while extending from the panel body 210.

Figure 10:
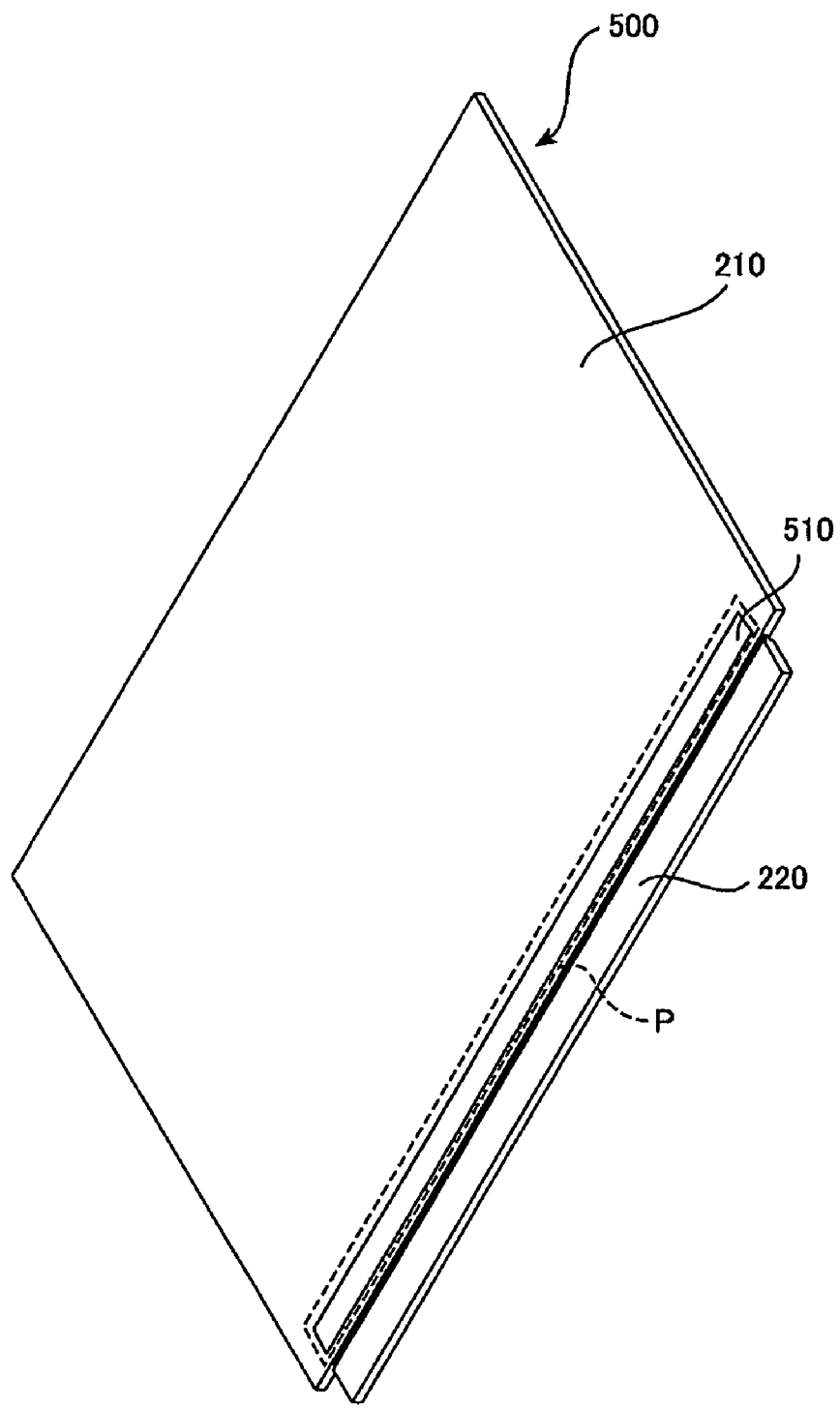
FIG. 10 is a view illustrating the display panel unit as viewed from the back according to the second embodiment of the present invention.

FIG. 10 is a view illustrating the back of the display panel unit 500 according to the present embodiment.

In the display panel unit 500 of the present embodiment, a heat transmission plate 510 of rubber for transmitting heat to a rear cover 600 (refer to FIG. 11) is attached to the linear area P in which heat generated by the LED light sources 201 is accumulated.

Figure 11:
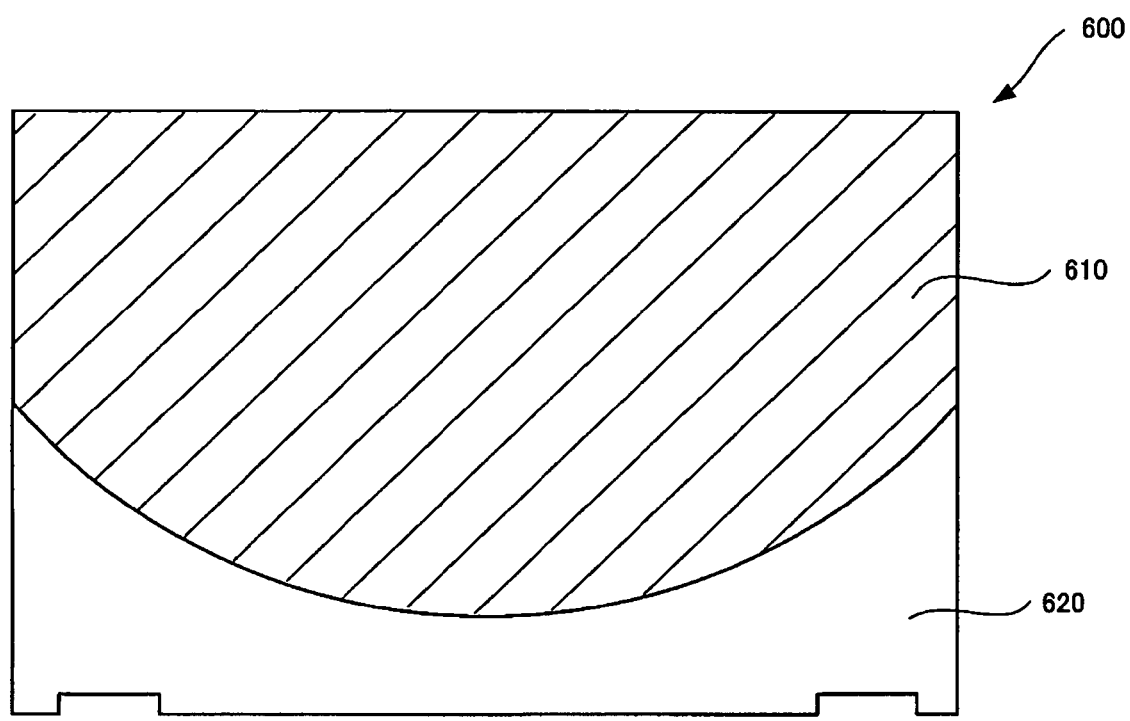
FIG. 11 is a view illustrating a rear cover which covers the rear face of the display panel unit.

FIG. 11 is a view illustrating the rear cover 600 that covers the back of the display panel unit 500.

The rear cover 600 of the present embodiment has the same shape as the rear cover 300 of the first embodiment illustrated in FIG. 3C, but is composed of two kinds of materials having thermal conductivity different from each other. According to the present embodiment, a metal area 610 of a metal having a high thermal conductivity and a plastic area 620 of a plastic having a relatively low thermal conductivity are formed in a hybrid manner, and the borderline between them protrudes downward in the rear cover 600.

Figure 12:
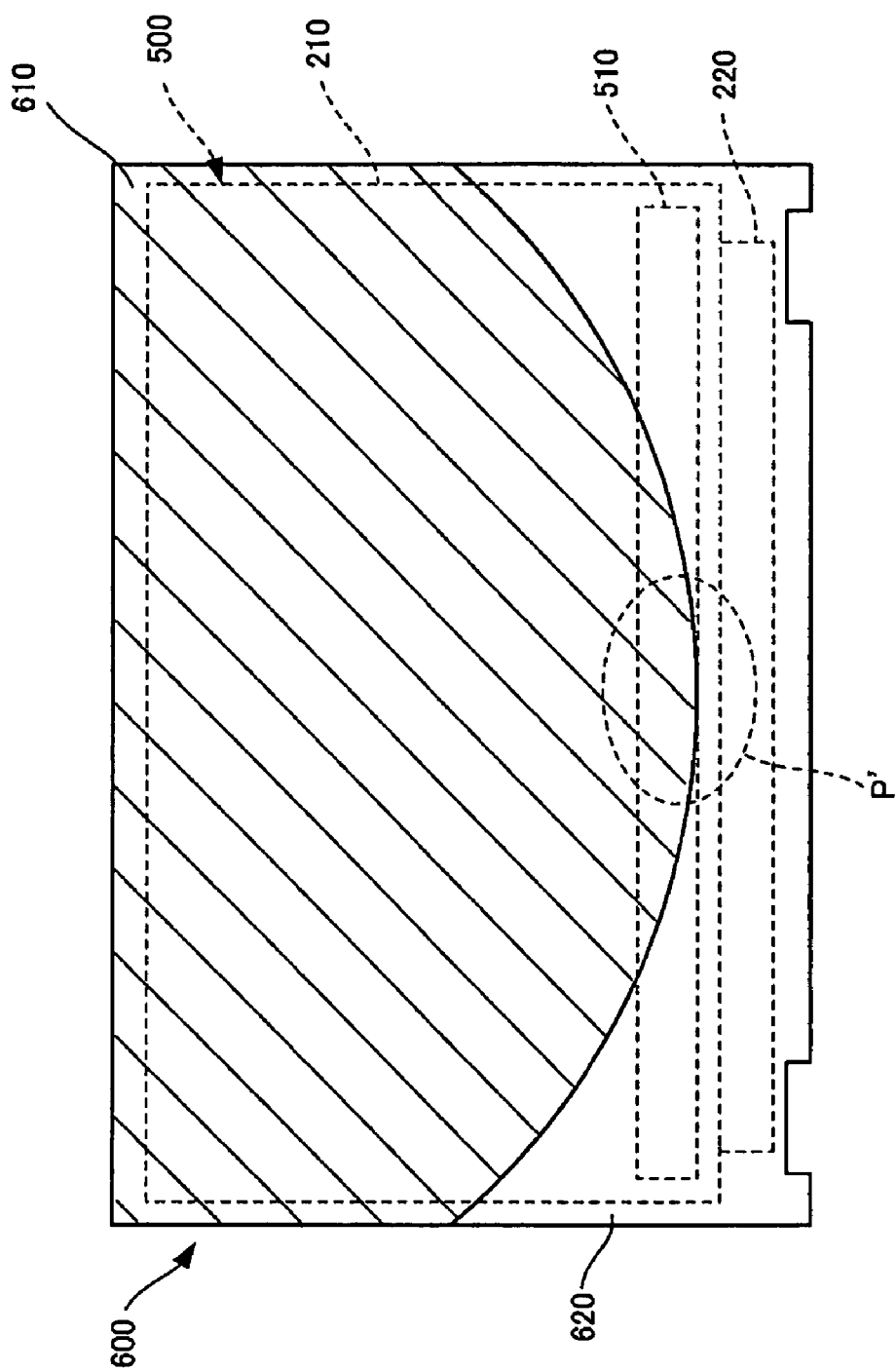
FIG. 12 is a view illustrating the positional relationship between the display panel unit and rear cover when the display panel unit is received in the rear cover.

FIG. 12 is a view illustrating the positional relationship between the display panel unit 500 and rear cover 600 when the display panel unit 500 is received in the rear cover 600.

As illustrated in FIG. 12, the heat transmission plate 510 arranged in the linear area P heated by the LED light sources 201 contacts the boundary and its vicinities between the metal area 610 and plastic area 620 of the rear cover 600; the central part P' of the linear area P (see FIG. 10) has a large contact area with the metal area 610, and the both ends of the linear area P have a large contact area with the plastic area 620. The heat generated by the linear area P is transmitted via the heat transmission plate 510 to the rear cover 600 and dissipated through the rear cover 600. In this case, since the central part P' in which heat tends to accumulate contacts the metal area 610, the heat is efficiently transmitted and dissipated; since the ends of the linear area P in which heat hardly accumulates contact the plastic area 620 having a low thermal conductivity, the heat is transmitted and dissipated with a low efficiency. Consequently, non-uniformity of temperature in the linear area P is reduced, allowing improvement of device life.

Now, the description of the second embodiment of the present invention is finished, and a third embodiment of the present invention will be described. The difference between the second embodiment and third embodiment lies in the configuration of the heat transmission plate mounted in the display panel unit and the structure of the rear cover; apart from this difference, the third embodiment has substantially the same structure as the second embodiment. Accordingly, the same reference alphanumeric characters are applied to parts corresponding to the second embodiment, and hence an explanation thereof is omitted; only the points different from the second embodiment will be described.

In the display device according to the present embodiment, there is used a rear cover which has the same configuration as the rear cover 600 of the second embodiment illustrated in FIG. 12 but has its whole surface composed of metal except for its part which covers the edge of the display panel unit.

Figure 13:
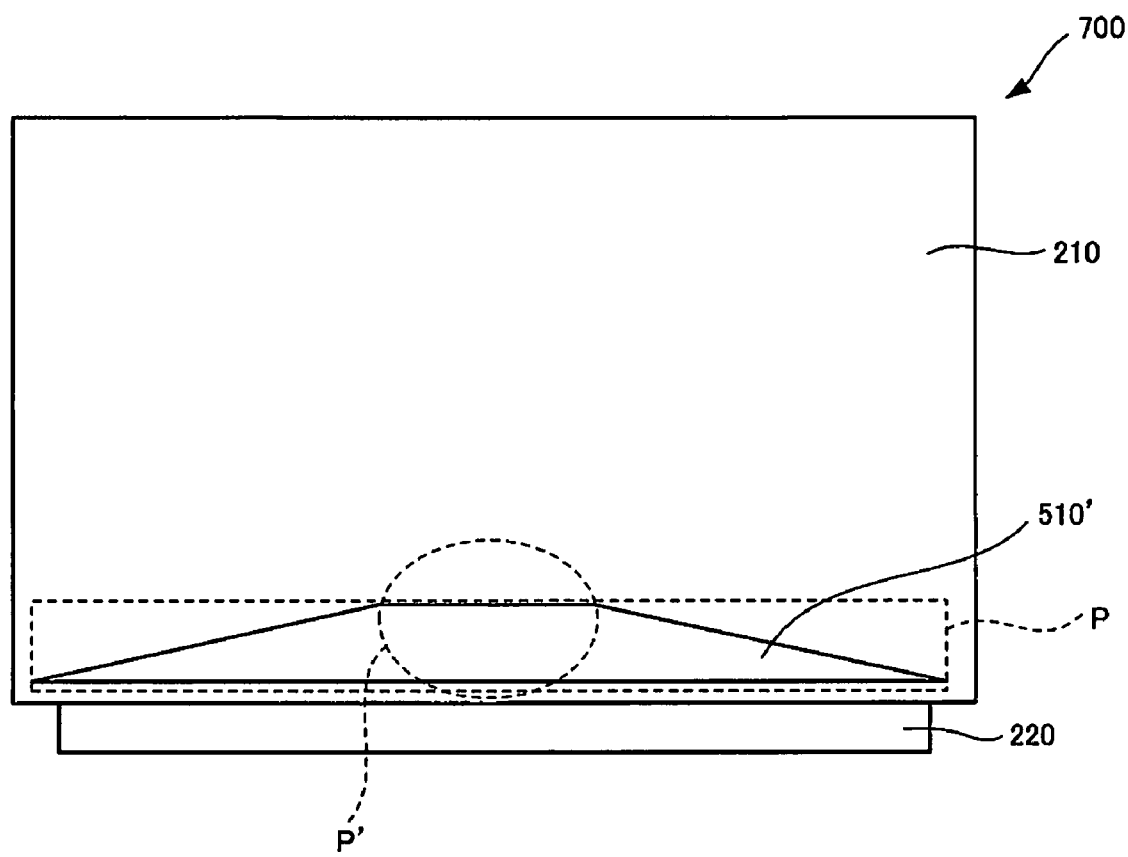
FIG. 13 is a view illustrating the rear face of a display panel unit according to a third embodiment of the present invention.

FIG. 13 is a view illustrating the back of a display panel unit 700 of the present embodiment.

The display panel unit 700 of the present embodiment includes, similarly to the display panel unit 500 of the second embodiment illustrated in FIG. 10, a panel body 210, a control board 220 and a heat transmission plate 510'. However, the configuration of the heat transmission plate 510' is different from that of the heat transmission plate 510 of the second embodiment. In the heat transmission plate 510' of the present embodiment, the width of the linear area P heated by the LED light sources becomes smaller from the central part P' to the ends of the linear area P; and the whole heat transmission plate 510' contacts the metal surface of the rear cover 600.

In the central part P', a larger amount of heat generated in the linear area P is transmitted through the heat transmission plate 510 to the rear cover 600 and dissipated through the rear cover 600. In this way, when the central part of the linear area P in which heat tends to accumulate has a larger width, also, non-uniformity of temperature in the linear area P can be suppressed.

The above description is of an example in which the present invention is applied to a personal computer. However, the present invention may be applied to, for example, a liquid crystal television set or a mobile telephone terminal.

Also, the above description is of an example in which non-uniformity of temperature in the linear area is suppressed by forming the heat transmission plate so that the central part of the linear area has a larger width. However, non-uniformity of temperature in the linear area may also be suppressed by using a heat transmission plate having a uniform width over the entire linear area, the both ends of the heat transmission plate being coated with resin which prevents heat transmission.

What is claimed is:

1. A display device comprising:
    a display panel unit having a display screen on which information is displayed; and
    a housing having a front housing section that covers the edge of the display screen of the display panel unit and a back housing section that covers the back of the display panel unit, in which one of the front housing section and the back housing section covers an exterior of the other when the front housing section and the back housing section engage each other at a flank of the display panel unit, the one has a projection formed inside thereof, and the other has an opening in which the projection is engaged, wherein the other has a wall in which the opening is formed and which has a predetermined thickness, and a thickness of a part of the wall, in which part the opening is formed, is thinner than the predetermined thickness, and the one has a wall in which the projection is formed and which is formed to have a thickness equal to a difference between the predetermined thickness and the thickness of the part, in which the opening is formed, of the wall of the other.

2. The display device according to claim 1, wherein the front housing section of the housing covers an exterior of the back housing section when the front housing section and the back housing section engage each other.

3. The display device according to claim 1, wherein the wall of the other has, a hole, and the one has an assist projection engaged in the hole.

4. The display device according to claim 1, wherein the wall of the other has an inner wall abutting the display panel unit.

5. The display device according to claim 3, wherein a protruding direction of the assist projection is different from a protruding direction of the projection of the one.

6. The display device according to claim 1, further comprising a control board that controls the display panel unit, is disposed between the display panel unit and the back housing section, and has a width smaller than a width of the display panel unit and a wire disposed between the control board and the other.

7. An information processing apparatus comprising:

a display section including:

a display panel unit having a display screen on which information is displayed, and a housing having a front housing section that covers the edge of the display screen of the display panel unit and a back housing section that covers the back of the display panel unit, in which one of the front housing section and the back housing section covers an exterior of the other when the front housing section and the back housing section engage each other at a flank of the display panel unit, the one has a projection formed inside thereof, and the other has an opening in which the projection is engaged; and an information processing section that processes information and causes the display section to display the processed information on the display screen of the display panel unit included in the display section, wherein the other has a wall in which the opening is formed and which has a predetermined thickness, and a thickness of a part of the wall, in which part the opening is formed, is thinner than the predetermined thickness, and the one has a wall in which the projection is formed and which is formed to have a thickness equal to a difference between the predetermined thickness and the thickness of the part, in which the opening is formed, of the wall of the other.

8. The information processing apparatus according to claim 7, wherein the front housing section of the housing covers an exterior of the back housing section when the front housing section and the back housing section engage each other.

9. The information processing apparatus according to claim 7, wherein the wall of the other has a hole and the one has an assist projection engaged in the hole.

10. The information processing apparatus according to claim 7, wherein the wall of the other has an inner wall abutting the display panel unit.

11. The information processing apparatus according to claim 9, wherein a protruding direction of the assist projection is different from a protruding direction of the projection of the one.

12. The information processing apparatus according to claim 7, further comprising a control board that controls the display panel unit, is disposed between the display panel unit and the back housing section, and has a width smaller than a width of the display panel unit and a wire disposed between the control board and the other.

* * * * *